(12) United States Patent
Warszawski et al.

(10) Patent No.: US 9,588,793 B2
(45) Date of Patent: Mar. 7, 2017

(54) CREATING NEW VIRTUAL MACHINES BASED ON POST-BOOT VIRTUAL MACHINE SNAPSHOTS

(71) Applicant: Red Hat Israel, Ltd., Raanana (IL)

(72) Inventors: Eduardo Warszawski, Kfar Saba (IL); Yeela Kaplan, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 110 days.

(21) Appl. No.: 14/136,100

(22) Filed: Dec. 20, 2013

(65) Prior Publication Data
US 2015/0177997 A1    Jun. 25, 2015

(51) Int. Cl.
*G06F 9/45* (2006.01)
*G06F 9/455* (2006.01)
*G06F 9/445* (2006.01)

(52) U.S. Cl.
CPC ............ *G06F 9/45558* (2013.01); *G06F 8/65* (2013.01); *G06F 2009/45562* (2013.01)

(58) Field of Classification Search
CPC ........................................... G06F 2009/45562
See application file for complete search history.

(56) References Cited

U.S. PATENT DOCUMENTS

| 8,225,314 | B2 | 7/2012 | Martins et al. |
| 8,443,365 | B2 | 5/2013 | Kumar |
| 8,495,019 | B2 | 7/2013 | Shisheng et al. |
| 2007/0074208 | A1 | 3/2007 | Ling et al. |
| 2012/0136989 | A1* | 5/2012 | Ferris ............... G06F 9/4856 709/224 |
| 2012/0144391 | A1 | 6/2012 | Ueda |
| 2014/0201572 | A1* | 7/2014 | Dancy et al. ............... 714/37 |

OTHER PUBLICATIONS

Craig, Donald, "Advantages of Simulation", Jul. 8, 1996.*
Nicolae, Bogdan, et al., "Going Back and Forth: Efficient Virtual Machine Image Deployment and Snapshotting on IaaS Clouds", Institut National De Recherche En Informatique Et En Automatique (INRIA), Oct. 2010.
Kehne, Jens, "A Distributed Cache for Fast VM Booting in Tightly Interconnected Cloud Environments", Karlsruher Institut for Technologie (KIT), Jun. 15, 2011-Sep. 15, 2011.
VMware Workstation 4, Using the Snapshot.

* cited by examiner

*Primary Examiner* — Edward Dudek, Jr.
(74) *Attorney, Agent, or Firm* — Lowenstein Sandler LLP

(57) ABSTRACT

Systems and methods for creating new virtual machines based on post-boot virtual machine snapshots. An example method may include: receiving a request to create a new virtual machine, identifying, in view of the request, a virtual machine snapshot, the virtual machine snapshot including one or more elements of an initialized virtual machine, determining an update efficiency metric with respect to the virtual machine snapshot, and in response to a determination that the update efficiency metric reflects that updating the virtual machine snapshot is relatively more efficient than creating a new virtual machine in lieu of the virtual machine snapshot, creating the new virtual machine in view of the virtual machine snapshot.

20 Claims, 3 Drawing Sheets

CREATING NEW VIRTUAL MACHINES BASED ON POST-BOOT VIRTUAL MACHINE SNAPSHOTS

TECHNICAL FIELD

Implementations of the present disclosure relate to a computing system, and more specifically, to creating new virtual machines based on post-boot virtual machine snapshots.

BACKGROUND

Virtualization entails running programs, usually multiple operating systems, concurrently and in isolation from other programs on a single system. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. A hypervisor may save a state of a virtual machine at a reference point in time, which is often referred to as a snapshot. The snapshot can be used to restore or rollback the virtual machine to the state that was saved at the reference point in time.

DESCRIPTION OF DRAWINGS

The details of one or more implementations are set forth in the accompanying drawings and the description below. Other features and advantages will be apparent from the description and drawings, and from the claims.

DETAILED DESCRIPTION

Figure 1:
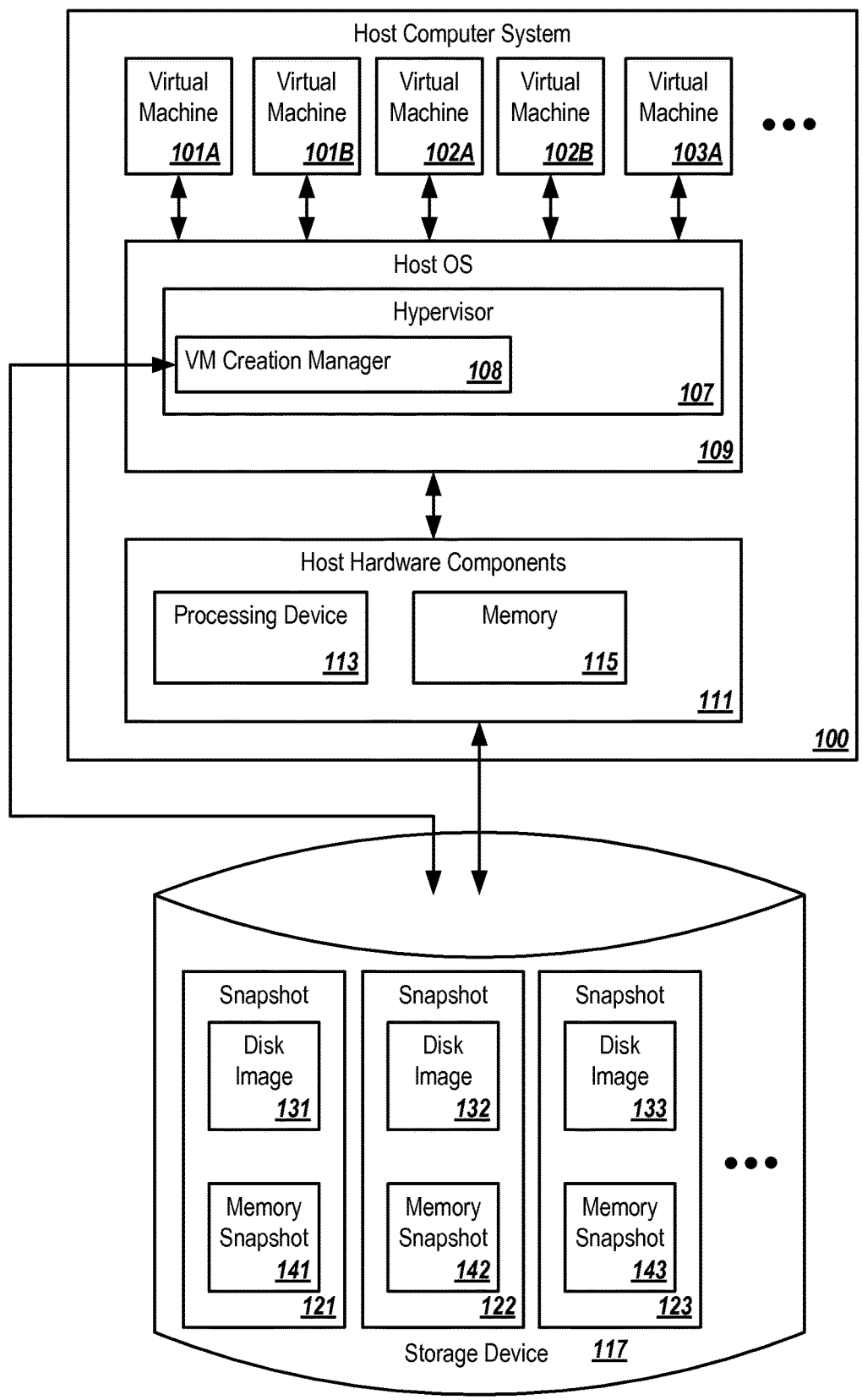
FIG. 1 is a block diagram of a host computer system in accordance with some implementations.

The present disclosure pertains to creating new virtual machines based on post-boot virtual machine snapshots.

It can be appreciated that when a physical machine is started, the machine goes through a boot and initialization process (including checking the current condition of the hardware). When a virtual machine (VM) starts, it repeats the boot and initialization process of a physical machine. The boot and initialization process can take significant time and consumes resources. However, this boot/initialization process is largely meaningless for a VM because a VM does not run on hardware but rather on top of a hypervisor or a host OS (which has previously checked the health of the hardware of the physical machine).

Accordingly, as described herein, upon receiving a request to create a new virtual machine, a stored virtual machine snapshot can be identified (e.g. based on the request). Such a virtual machine snapshot can include, for example, a memory snapshot and/or the complete state of the virtual machine. Having identified a virtual machine snapshot that may correspond to and/or be configured to correspond to the request, one or more aspects of the memory snapshot can be updated. Based on such a virtual machine snapshot and the referenced updates, a new virtual machine can be created. In doing so, multiple new virtual machines can be created based on stored snapshots without having to undergo boot processes. Moreover, despite being created from stored snapshots, such new virtual machines can each be created with different configurations to account for various pertinent changes and/or constraints.

Additionally, while certain efficiencies (e.g., time and/or processing efficiencies) can be realized by generating new virtual machines based on such stored snapshots, in some scenarios such approaches/techniques can also entail certain inefficiencies. For example, it can be appreciated that, with respect to a virtual machine snapshot with respect to which numerous and/or resource intensive updates may need to be performed, it may be relatively less efficient to perform such updates to the stored snapshot than creating a new virtual machine from a template image (e.g., an image that includes the guest OS and guest software but not the current memory and state of another virtual machine), or from an outdated snapshot of a running virtual machine being migrated or copied (e.g., a snapshot that was created in the past and that does not reflect the current memory and state of the running virtual machine). Accordingly, in scenarios in which it is determined that it may be too inefficient (e.g., with respect to time and/or processing resources) to update a stored snapshot, a new virtual machine can be created without utilizing a current snapshot, while in scenarios in which it is determined that updating the stored snapshot is likely to be relatively more efficient than creating a new virtual machine without a current snapshot, such a snapshot can be updated and a new virtual machine can be generated from the updated snapshot.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

For brevity, simplicity and by way of example, a hypervisor performs many of the operations described herein. It is contemplated that other actors may perform some or all of the operations described herein, including a host operating system, multiple hypervisors, a VM creation manager, and the like, including a combination thereof.

FIG. 1 is a block diagram that illustrates an example of a host computer system 100 that hosts one or more VMs 101A-A. Each VM can run a guest operating system (OS). The VMs may have the same or different guest operating systems, such as Microsoft Windows®, Linux®, Solaris®, Mac®OS, etc. The host computer system 100 may be a server, a workstation, a personal computer (PC), a mobile phone, a palm-sized computing device, a personal digital assistant (PDA), etc.

The host computer system 100 runs a hypervisor 107 to virtualize access to the underlying host hardware, making the use of the VM transparent to the guest OS and a user of the host computer system 100. The hypervisor 107 may also be known as a virtual machine monitor (VMM) or a kernel-based hypervisor. The hypervisor 107 may be part of a host OS 109 (as shown in FIG. 1), run on top of the host OS 109, or run directly on the host hardware without an operating system beneath it (i.e., bare metal). The host OS 109 can be the same OS as the guest OS, or can be a different OS. The hypervisor 107 can include a VM creation manager 108 that handles VM creation.

The host computer system 100 includes hardware components 111 such as one or more physical processing devices (e.g., central processing units (CPUs)) 113, memory 115 (also referred to as "host memory" or "physical memory") and other hardware components. In one implementation, the host computer system 100 includes one or more physical devices (not shown), which can be audio/video devices (e.g., video cards, sounds cards), network interface devices, printers, graphics modules, graphics devices, system components (e.g., PCI devices, bridges, ports, buses), etc. It is understood that the host computer system 100 may include any number of devices.

The host computer system 100 may also be coupled to one or more storage devices 117 via a direct connection or a network. The storage device 117 may be an internal storage device or an external storage device. Examples of storage devices include hard disk drives, optical drives, tape drives, solid state drives, and so forth. Storage devices may be accessible over a local area network (LAN), a wide area network (WAN) and/or a public network such as the internet. Examples of network storage devices include network attached storage (NAS), storage area networks (SAN), cloud storage (e.g., storage as a service (SaaS)), and so forth.

The storage device 117 may store one or more files, such as snapshots 121, 122, 123. Such snapshots 121-123 can reflect or include a copy of a virtual machine, such as in a particular state. In some implementations, each snapshot 121-123 can include a respective disk image 131, 132, 133. Disk images 131-133 can represent data on a hard disk. Such disk images can be in any format, such as a portable binary image (e.g., raw), copy-on-write (e.g., cow), compressed loop (e.g., cloop), Quick EMUlator (QEMU) copy-on-write format (e.g., qcow, qcow2), and others, such as vmdk, vdi, etc. In certain implementations, each disk image 131-133 may be a single file, set of files or sequence of data (e.g., a contiguous or non-contiguous set of blocks in a block device) that contains the contents and structure representing a storage device such as a hard drive. Additionally, in some implementations each snapshot 121-123 can include a respective memory snapshot 141, 142, 143. Memory snapshots 141-143 can contain copies of the memory of a respective VM. Each snapshot 121-123 can include various parameters which can reflect, for example, the operating system installed on the virtual machine, the initialization state or status of the virtual machine (e.g., post-boot), and/or various applications and/or settings that are initialized and/or running within the virtual machine. Such parameters can be utilized, for example, in order to identify, in response to a request to initialize a new virtual machine with certain parameters (e.g., running a certain operating system and having one or more applications already initialized) a stored snapshot that includes some or all of such requested parameters. Additionally, it should be understood that when the host computer system 100 is attached to multiple storage devices 117, some files may be stored on one storage device, while other files may be stored on another storage device.

Figure 2:
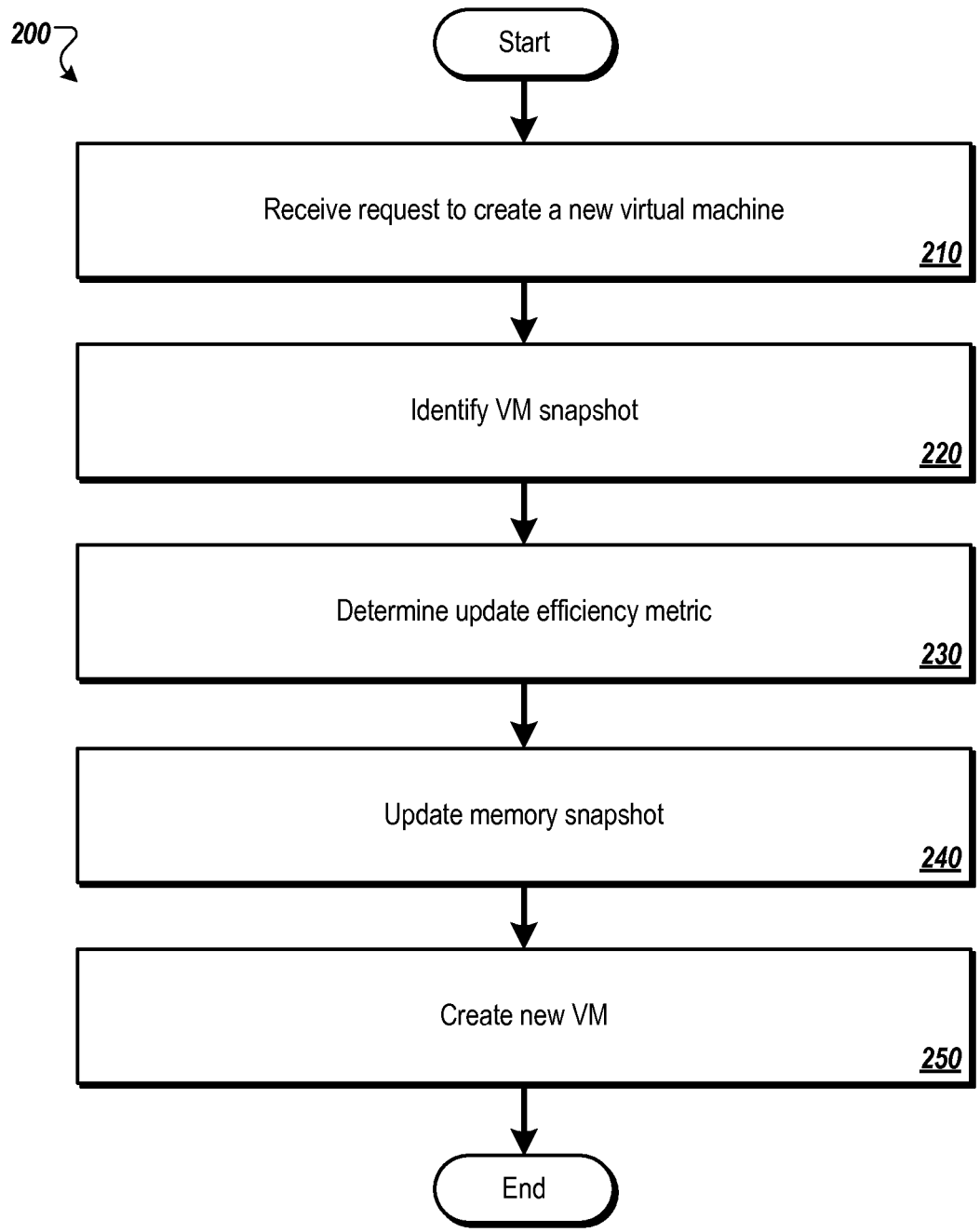
FIG. 2 is a flow diagram of a method for creating new virtual machines based on post-boot virtual machine snapshots in accordance with some implementations.

FIG. 2 is a flow diagram of a method 200 for creating a live snapshot in accordance with some implementations. Method 200 can be performed by processing logic (e.g., in computing system 300 of FIG. 3) that may comprise hardware (e.g., circuitry, dedicated logic, programmable logic, microcode, etc.), software (such as instructions run on a processing device), firmware, or a combination thereof. In one implementation, method 200 is performed by hypervisor 107 and/or VM creation manager 108 of FIG. 1. For clarity of presentation, the description that follows uses the system 100 as examples for describing the method 200. However, another system, or combination of systems, may be used to perform the method 200.

At block 210, a request can be received. In certain implementations, such a request can be a request to create a new virtual machine. For example, VM creation manager 108 and/or hypervisor 107 can receive a request to create a new virtual machine from a system administrator, a host controller managing VMs on various hosts, etc. Such a request can include one or more parameters which can describe or dictate various aspects, features, etc. that such a new virtual machine is to possess or include. For example, such a request can dictate the operating system that the new virtual machine should have installed, the initialization state that the virtual machine should have (e.g., whether or not the virtual machine should already be booted, etc.), various applications that should be running within the virtual machine (e.g., a web browser, word processor, etc.), etc.

At block 220, a virtual machine snapshot can be identified. That is, having received a request (such as at block 210) to create a new virtual machine, various stored snapshots (e.g., snapshots 121-123) can be analyzed and/or queried (e.g., by VM creation manager 108 and/or hypervisor 107) in order to identify one or more snapshots that possess and/or include the parameters/requirements reflected in the request. Examples of such virtual machine snapshots include but are not limited to a snapshot of a virtual machine that has already undergone a boot process, a snapshot of a virtual machine that has one or more programs or applications already running, a snapshot of a virtual machine that has a particular operating system installed, etc. For example, in response to a request to initialize a new virtual machine with certain parameters (e.g., running a certain operating system and having one or more applications already initialized), the parameters of various stored snapshot (e.g., 121-123) can be analyzed to identify those stored snapshot(s) that include some or all of such requested parameters.

As noted, in certain implementations, such a virtual machine snapshot 121, 122, 123 can be identified based on/in view of a request (such as the request received at block 210). Moreover, in certain implementations such a virtual machine snapshot can include one or more elements of an initialized virtual machine. Examples of such elements include but are not limited to a memory snapshot. As depicted in FIG. 1, each snapshot 121, 122, 123 can include a corresponding memory snapshot 141, 142, 143. Such a memory snapshot can reflect, for example, the RAM state of a virtual machine which can include the current state of various processes running in the virtual machine. As also depicted in FIG. 1, each snapshot 121, 122, 123 can include a corresponding disk image 131, 132, 133. Such a disk image can reflect, for example, a snapshot of the disk storage of the virtual machine (e.g., persistent data of the virtual machine).

At block 230, an update efficiency metric can be determined. In certain implementations, such an update efficiency metric can be determined with respect to the virtual machine snapshot (such as the virtual machine snapshot identified at block 220). Moreover, in certain implementations the update efficiency metric can be determined to reflect a relative efficiency of updating the virtual machine snapshot. That is, it can be appreciated that different virtual machines may have different parameters, settings, configurations, etc., which may, as a result, entail more or fewer updates to be performed to a snapshot of the virtual machine (e.g., to a memory snapshot), as described herein. Additionally, depending on the nature of such updates, the referenced updating may entail additional delays and/or processing resources (e.g., with respect to updates pertaining to larger amounts of data, parameters that change relatively more frequently, etc.). Accordingly, having identified (such as at block 220), a virtual machine snapshot that possesses and/or includes the parameters/requirements reflected in a received request, an update efficiency metric of such a snapshot can be determined. In certain implementations, such an update efficiency metric can be determined (e.g., by VM creation manager 108 and/or hypervisor 107) by simulating the updating of the snapshot and/or by analyzing one or more aspects of the snapshot pertaining to such updates (e.g., the size and/or quantity of such updates, as such factors may entail additional processing requirements and/or delays when updating the snapshot). Moreover, in certain implementations such an update efficiency metric can reflect an amount of time (e.g., in milliseconds, seconds, etc.) and/or processing power (and/or any other resource overhead) that performing such update(s) is likely to entail.

At block 240, the memory snapshot can be updated. That is, it can be appreciated that while various aspects and/or elements of the memory snapshot can remain constant (e.g., from the time the snapshot was initially created until the time that a new virtual machine is subsequently created based on it), other aspects and/or elements of the memory snapshot may change in the interim. For example, it can be appreciated that the time and/or date stored in the memory snapshot (e.g., at the time that the snapshot was initially created) change and thus require updating when the snapshot is used to create a new virtual machine (as described herein). By way of further illustration, one or more other aspects and/or elements of the memory snapshot may require updating, such as in a scenario where the memory size available to the virtual machine is desired to be increased and/or decreased. In lieu of generating an entirely new virtual machine reflecting such changes/configurations, the existing memory snapshot 141, 142, 143 can be updated (e.g., by VM creation manager 108 and/or hypervisor 107) to reflect such changes. For example, the time and/or date stored in the memory snapshot can be updated, the memory size of the memory snapshot can be adjusted, etc. In doing so, in lieu of generating a new virtual machine that reflects the requested/required configuration (e.g., the current time/date, etc.), aspects of an existing snapshot can be updated, thereby avoiding unnecessary processing operations, overhead, and/or delays that may be attendant with generating an entirely new virtual machine.

It should be noted that, in various implementations, aspects and/or elements of the memory snapshot can be updated based on/in response to a request (such as the request received at block 210). For example, while it has been described (e.g., at block 220) that a snapshot (or snapshots) that includes the parameters/requirements reflected in the request can be identified, it can be appreciated that in various scenarios existing snapshots 121, 122, 123, may include some, but not all, of the parameters/requirements reflected in the request (e.g., may not have the requested memory size, etc.). As such, having identified (such as at block 220) a snapshot that includes some of the requested parameters (and/or parameters that are comparable and/or compatible with the requested parameters), such a snapshot can be updated (e.g., by updating its respective memory snapshot) in accordance with the requested parameters. In doing so, a new virtual machine can be generated based on such a snapshot even in a scenario where the stored snapshot does not initially include all the requested parameters. Additionally, in certain implementations such updates can be performed and/or implemented with respect to the new virtual machine that is generated based on the snapshot, while the stored snapshot itself 121-123 can be maintained without the updates.

Moreover, in certain implementations such a snapshot can be updated based on various determinations with respect to an update efficiency metric determined with respect to the snapshot (such as at block 230). For example, the referenced update efficiency metric (which, as noted, can reflect and amount of time, processing power/other resources, etc.) can be compared to a comparable metric that can be generated (e.g., based on an analysis, simulation, etc.) to reflect the amount of time, processing power, etc., that generating a new virtual machine is likely to entail (e.g., without the use of the snapshot, such as by using a template image). Accordingly, in certain implementations, in scenarios where it can be determined (e.g., based on such a comparison) that updating such a snapshot is likely to entail more time, processing power, etc., (and thus be relatively less efficient) than creating a new virtual machine (e.g., without the use of the snapshot), the snapshot may not be updated (and a new virtual machine can be created in response to the request received at block 210, in lieu of updating the referenced snapshot). In doing so, such a snapshot can be updated in scenarios where doing so is relatively more efficient than creating a new virtual machine.

At block 250, one or more new virtual machine(s) can be created. In certain implementations, such a virtual machine can be created based on/in view of the virtual machine snapshot. Moreover, in certain implementations the virtual machine can be generated based on/in view of the virtual machine snapshot (such as the virtual machine snapshot identified at block 220) and an update to the memory snapshot (such as updated at block 240). In doing so, a virtual machine can be created queried (e.g., by VM creation manager 108 and/or hypervisor 107) without having to undergo various boot processes, while also enabling such a virtual machine to account for various pertinent changes and/or constraints. Additionally, in certain implementation the new virtual machine can be created based on/in response to a determination that the update efficiency metric (such as that determined at block 230) reflects that updating the virtual machine snapshot is relatively more efficient than generating a new virtual machine (e.g., in lieu of the virtual machine snapshot).

By way of illustration, as depicted in FIG. 1, virtual machines 101A, 101B, 102A, 102B, and 103A can be created based on various virtual machine snapshots 121, 122, 123. For example, virtual machines 101A and 101B can be created based on snapshot 121 (which may reflect a virtual machine having one operating system, configuration, etc.), while virtual machines 102A and 102B can be created based on snapshot 122 (which may reflect a virtual machine having a different operating system, configuration, etc.). In doing so, new virtual machines 101A, 101B, 102A, etc. can be created based on stored snapshots 121-123 without having to undergo various boot processes. Moreover, despite being created from stored snapshots 121-123, such new virtual machines 101A, 101B, 102A, etc. can each be created with different configurations to account for various pertinent changes and/or constraints.

Figure 3:
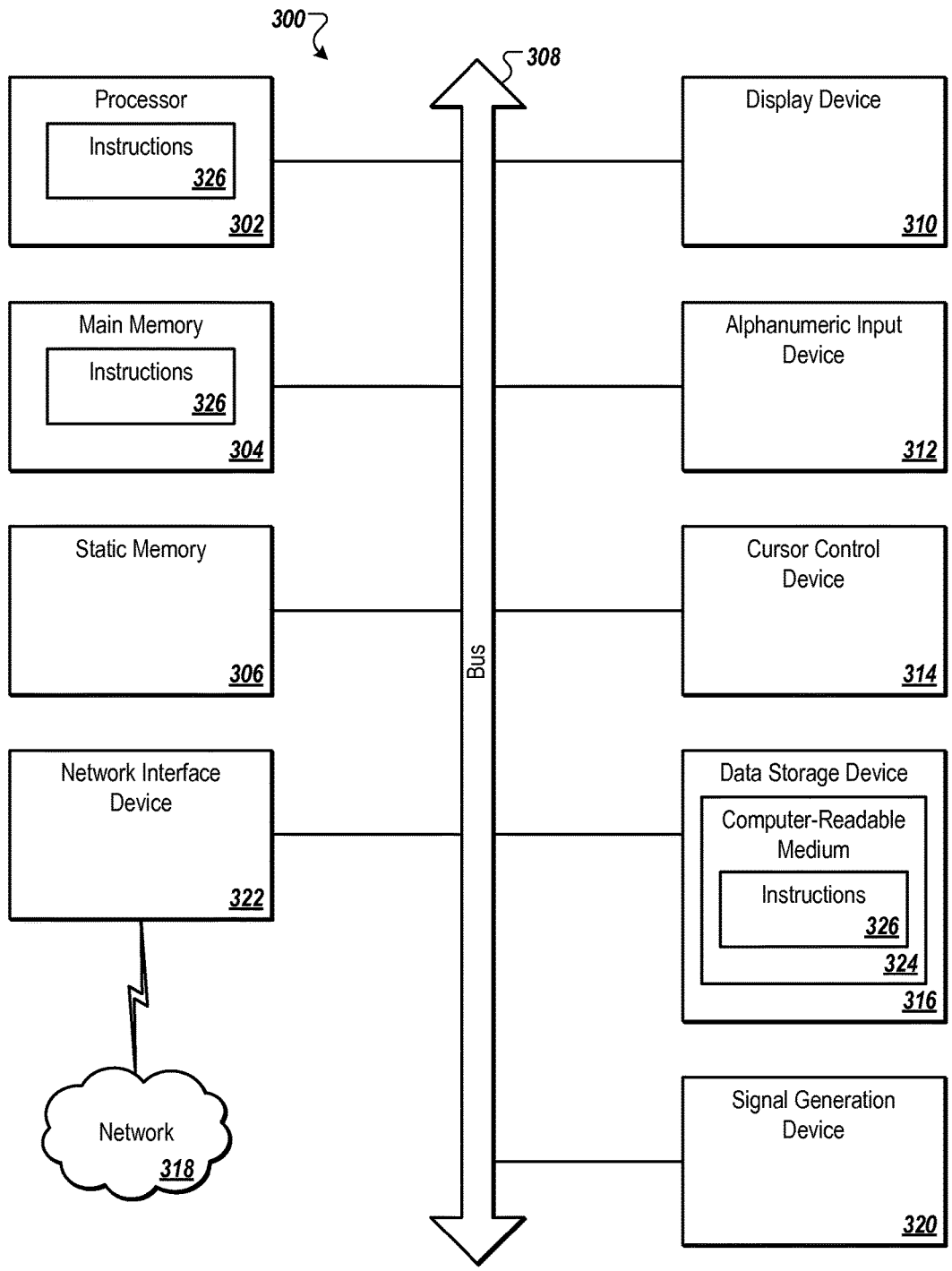
FIG. 3 is a schematic diagram that shows an example of a machine in the form of a computer system.

FIG. 3 is a schematic diagram that shows an example of a machine in the form of a computer system 300. The computer system 300 executes one or more sets of instructions 326 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 326 to perform any one or more of the methodologies discussed herein.

The computer system 300 includes a processor 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 316, which communicate with each other via a bus 308.

The processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions of the host computer system 100 for performing the operations and steps discussed herein.

The computer system 300 may further include a network interface device 322 that provides communication with other machines over a network 318, such as a local area network (LAN), an intranet, an extranet, or the Internet. The computer system 300 also may include a display device 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable storage medium 324 on which is stored the sets of instructions 326 of the host computer system 100 embodying any one or more of the methodologies or functions described herein. The sets of instructions 326 of the host computer system 100 may also reside, completely or at least partially, within the main memory 304 and/or within the processor 302 during execution thereof by the computer system 300, the main memory 304 and the processor 302 also constituting computer-readable storage media. The sets of instructions 326 may further be transmitted or received over the network 318 via the network interface device 322.

While the example of the computer-readable storage medium 324 is shown as a single medium, the term "computer-readable storage medium" can include a single medium or multiple media (e.g., a centralized or distributed database, and/or associated caches and servers) that store the sets of instructions 326. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "receiving", "identifying", "creating", "updating", "generating", "adjusting", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving a request to create a new virtual machine;
   identifying, in view of the request, a virtual machine snapshot, the virtual machine snapshot comprising one or more elements of an initialized virtual machine;
   simulating an update to the virtual machine snapshot to determine an update efficiency metric with respect to the virtual machine snapshot;
   determining a second efficiency metric reflecting an efficiency associated with generating a new virtual machine without using the virtual machine snapshot;
   comparing the update efficiency metric to the second efficiency metric; and
   in response to a determination that the comparing reflects that the update to the virtual machine snapshot is relatively more efficient than generating the new virtual machine without using the virtual machine snapshot, creating, by a processing device, the new virtual machine in view of the virtual machine snapshot.

2. The method of claim 1, wherein the one or more elements comprises a memory snapshot.

3. The method of claim 2, further comprising updating the memory snapshot.

4. The method of claim 3, wherein updating the memory snapshot comprises updating at least one of a time or a date stored in the memory snapshot.

5. The method of claim 3, wherein updating the memory snapshot comprises adjusting a memory size.

6. The method of claim 3, wherein creating the virtual machine comprises generating the virtual machine in view of the virtual machine snapshot and an update to the memory snapshot.

7. The method of claim 1, wherein the virtual machine snapshot comprises a virtual machine that has undergone a boot process.

8. The method of claim 1, wherein the virtual machine snapshot comprises a virtual machine having one or more applications running.

9. A system comprising:
   a memory; and
   a processing device, operatively coupled to the memory, to:
     receive a request to create a new virtual machine;
     identify, in view of the request, a virtual machine snapshot, the virtual machine snapshot comprising one or more elements of an initialized virtual machine;
     simulate an update to the virtual machine snapshot to determine an update efficiency metric with respect to the virtual machine snapshot;
     determine a second efficiency metric reflecting an efficiency associated with generation of a new virtual machine without using the virtual machine snapshot;
     compare the update efficiency metric to the second efficiency metric; and
     in response to a determination that the comparison reflects that the update to the virtual machine snapshot is relatively more efficient than generation of the new virtual machine without using the virtual machine snapshot, create the new virtual machine in view of the virtual machine snapshot.

10. The system of claim 9, wherein the one or more elements comprises a memory snapshot.

11. The system of claim 10, wherein the processing device is further to update the memory snapshot.

12. The system of claim 11, wherein to update the memory snapshot the processing device is to update at least one of a time or a date stored in the memory snapshot.

13. The system of claim 11, wherein to update the memory snapshot the processing device is to adjust a memory size.

14. The system of claim 11, wherein to create the virtual machine the processing device is to generate the virtual machine in view of the virtual machine snapshot and an update to the memory snapshot.

15. The system of claim 9, wherein the virtual machine snapshot comprises a virtual machine that has undergone a boot process.

16. The system of claim 9, wherein the virtual machine snapshot comprises a virtual machine having one or more applications running.

17. A non-transitory computer-readable storage medium having instructions that, when executed by a processing device, cause the processing device to:
   receive a request to create a new virtual machine;
   identify, in view of the request, a virtual machine snapshot, the virtual machine snapshot comprising a memory snapshot;
   update the memory snapshot;
   simulate an update to the virtual machine snapshot to determine an update efficiency metric with respect to the virtual machine snapshot;
   determine a second efficiency metric reflecting an efficiency associated with generation of a new virtual machine without using the virtual machine snapshot;
   compare the update efficiency metric to the second efficiency metric; and
   in response to a determination that the comparison reflects that the update to the virtual machine snapshot is relatively more efficient than generation of the new virtual machine without using the virtual machine snapshot, create, by the processing device, the new virtual machine in view of the virtual machine snapshot and an update to the memory snapshot.

18. The non-transitory computer-readable storage medium of claim 17, wherein to update the memory snapshot the processing device is to update at least one of a time or a date stored in the memory snapshot.

19. The non-transitory computer-readable storage medium of claim 17, wherein to update the memory snapshot the processing device is to adjust a memory size.

20. The non-transitory computer-readable storage medium of claim 17, wherein the virtual machine snapshot comprises a virtual machine that has undergone a boot process.

* * * * *